(12) United States Patent
Alba

(10) Patent No.: US 7,657,222 B2
(45) Date of Patent: Feb. 2, 2010

(54) WIRELESS CABLE NETWORKING GATEWAY AND WI-FI SYSTEM INCORPORATING THE SAME

(75) Inventor: Joseph N. Alba, Northampton, PA (US)

(73) Assignee: Agere Systems Inc., Allentown, PA (US)

( * ) Notice: Subject to any disclaimer, the term of this patent is extended or adjusted under 35 U.S.C. 154(b) by 476 days.

(21) Appl. No.: 10/336,013

(22) Filed: Jan. 2, 2003

(65) Prior Publication Data

US 2004/0132403 A1 Jul. 8, 2004

(51) Int. Cl.
*H04H 20/71* (2008.01)

(52) U.S. Cl. .................. 455/3.03; 455/3.01; 455/424; 455/426.1

(58) Field of Classification Search .............. 455/3.01, 455/433, 566, 3.03, 424, 426.1; 370/260, 370/352; 725/34, 81, 119, 130, 82, 120
See application file for complete search history.

(56) References Cited

U.S. PATENT DOCUMENTS

| | | | | |
|---|---|---|---|---|
| 6,188,871 | B1 * | 2/2001 | Kitamura et al. | 725/120 |
| 6,310,862 | B1 * | 10/2001 | Roy | 370/260 |
| 6,377,782 | B1 * | 4/2002 | Bishop et al. | 455/3.01 |
| 6,862,622 | B2 * | 3/2005 | Jorgensen | 709/226 |
| 6,889,191 | B2 * | 5/2005 | Rodriguez et al. | 704/275 |
| 7,089,577 | B1 * | 8/2006 | Rakib et al. | 725/87 |
| 2002/0118676 | A1 * | 8/2002 | Tonnby et al. | 370/352 |
| 2002/0124253 | A1 * | 9/2002 | Eyer et al. | 725/34 |
| 2002/0144116 | A1 * | 10/2002 | Giobbi | 713/168 |
| 2002/0170071 | A1 * | 11/2002 | Parnell et al. | 725/130 |
| 2002/0193910 | A1 * | 12/2002 | Strege et al. | 700/279 |
| 2003/0106067 | A1 * | 6/2003 | Hoskins et al. | 725/119 |
| 2003/0140351 | A1 * | 7/2003 | Hoarty et al. | 725/132 |
| 2003/0192053 | A1 * | 10/2003 | Sheppard et al. | 725/81 |
| 2003/0207685 | A1 * | 11/2003 | Rankin | 455/433 |
| 2004/0172658 | A1 * | 9/2004 | Rakib et al. | 725/120 |
| 2005/0055321 | A1 * | 3/2005 | Fratkina et al. | 706/45 |

* cited by examiner

*Primary Examiner*—Nay A Maung
*Assistant Examiner*—Tuan H Nguyen

(57) ABSTRACT

A wireless cable networking gateway, a method of wireless cable networking and a Wi-Fi system incorporating the gateway or the method. In one embodiment, the gateway includes: (1) a wireless transceiver for transferring data between wireless and wireline domains, (2) wide-area and premises cable interfaces for coupling the wireless cable networking gateway to respective wide-area and premises cable networks and (3) channel insertion and extraction circuitry, coupling the wireless transceiver, the wide-area cable interface and the premises cable interface, that routes the data between the wireless transceiver and at least a portion of a television channel to be transmitted across at least the premises cable interface, remaining television channels being transmitted from the wide-area cable interface to the premises cable interface.

6 Claims, 5 Drawing Sheets

WIRELESS CABLE NETWORKING GATEWAY AND WI-FI SYSTEM INCORPORATING THE SAME

TECHNICAL FIELD OF THE INVENTION

The present invention is directed, in general, to computer network routers and gateways and, more specifically, to a wireless cable networking gateway and Wireless Fidelity ("Wi-Fi") system incorporating the gateway or a method of wireless cable networking.

BACKGROUND OF THE INVENTION

Computer systems configured as local area networks (LANs) have become evermore common during the last two decades and have now found wide-ranging use in businesses, schools and even homes. The most common LANs are client-server, in which one or more server processing devices provide programs and/or data to a larger number of client processing devices, and peer-to-peer, in which primarily data are shared among peer processing devices. The various networked processing devices are often hardwired together. By their nature, however, hardwired LANs do not allow the processing devices to be moved about easily.

Wireless local area networks (WLANs) provide the advantages of a LAN and allow device mobility by providing wireless connections between processing devices. Although the concept of a WLAN had been batted around for years in various technical forums, interest in WLANs remained theoretical until the U.S. government allocated the 2.4 GHz band for unlicensed use by industrial, scientific and medical ("ISM") applications. WLAN processing devices built to operate in that band most often employ either direct sequence spread spectrum ("DSSS") or frequency-hopping spread spectrum ("FHSS") techniques to communicate between roaming mobile processing devices and network wireless access points ("WAPs").

In a typical WLAN, one or more central servers are given an air interface by associated network WAPs. Each WAP includes a transceiver for communicating with at least one mobile processing device (including, but not limited to, a gaming system console, a mobile telephone, a personal digital assistant, or a notepad, desktop or laptop computer). Each mobile processing device establishes a communication link with a WAP by scanning the ISM band to find an available WAP. Once a reliable link is established, the mobile processing device is able to interact with other mobile processing devices, a server or both. This allows mobility for the mobile processing device without the length of a hardwired connection to the LAN limiting the movement.

The popularity and applications of WLANs have grown further with the approval of the IEEE 802.11 standard. Developed in the late 1990's, IEEE 802.11 provided guidelines to promote the interoperability and the creation of wireless products. An offshoot of IEEE 802.11, 802.11(b), commonly referred to as "Wi-Fi," has increased the popularity by providing a higher data rate of 11 Mbps.

One area of development for WLANs has been the development of wireless networks in schools, hospitals, hotels and homes employing Wi-Fi. A standard home Wi-Fi WLAN may support a desktop and a few laptop computers. Another home Wi-Fi WLAN may provide wireless data on television sets throughout the home. This particular WLAN may permit the viewing of Wi-Fi data from games, computers or other wireless devices on each television set in the home.

Viewing on the television sets, however, requires that each television set be separately enabled to accept the Wi-Fi data. Often each television in a home is already connected to a cable network within the home. The home cable network is typically connected to a local cable network or a satellite receiver via a central node or box such as a cable box. Requiring Wi-Fi enabled television sets, therefore, results in an additional Wi-Fi network in parallel with the existing home cable network. Additionally, the parallel Wi-Fi network would not be backward compatible to non-enabled Wi-Fi television sets.

Accordingly, what is needed in the art is a more effective way to provide connectivity between wireless devices and televisions.

SUMMARY OF THE INVENTION

To address the above-discussed deficiencies of the prior art, the present invention provides a wireless cable networking gateway, a method of wireless cable networking and a Wi-Fi system incorporating the gateway or the method. In one embodiment, the gateway includes: (1) a wireless transceiver for transferring data between wireless and wireline domains, (2) wide-area and premises cable interfaces for coupling the wireless cable networking gateway to respective wide-area and premises cable networks and (3) channel insertion and extraction circuitry, coupling the wireless transceiver, the wide-area cable interface and the premises cable interface, that routes the data between the wireless transceiver and at least a portion of a television channel to be transmitted across at least the premises cable interface, remaining television channels being transmitted from the wide-area cable interface to the premises cable interface.

The present invention therefore introduces the broad concept of marrying a WAP to a premises cable network, such as those commonly found in homes, hotels and hospitals. The WAP is made part of a wireless cable networking gateway, which allows data communicated to or from the WAP to be injected into or extracted from a portion or all of a channel. The channel is displayable on any conventional television set (or sometimes alternatively called a "monitor") that is in the premises cable network. In this manner, wireless devices can display data through, or receive data from, the premises cable network.

In one embodiment of the present invention, the wireless transceiver is IEEE 802.11 compliant. As described above, processing devices, including wireless transceivers, operating in accordance with the well-known 802.11(b) standard are called "Wi-Fi" devices. Those skilled in the art will recognize, however, that other conventional or later-defined wireless communications standards fall within the broad scope of the present invention.

In one embodiment of the present invention, the gateway further includes digital/analog conversion circuitry, interposing the wireless transceiver and the channel insertion and extraction circuitry, for converting the data between digital and analog domains. This implies that at least the premises cable network carries at least analog signals. Alternatively, the gateway may lack the digital/analog conversion circuitry and therefore may operate with respect to a digital premises cable network.

In one embodiment of the present invention, the gateway further includes processing circuitry, coupled to the channel insertion and extraction circuitry, that allows the television channel to be remotely selectable. The processing circuitry, which may be any processor or controller, may manage the routing of the data through the gateway and define the television channel or channels to be employed to carry the data.

In one embodiment of the present invention, the gateway further includes a buffer, interposing the wireless transceiver and the channel insertion and extraction circuitry, for buffering the data. Those skilled in the art are familiar with the structure and operation of buffers.

In one embodiment of the present invention, the at least the portion of the television channel is further transmitted across the wide-area cable interface. Thus, the gateway may be used as a gateway to a wide-area cable network, such as one that might serve an entire community.

In one embodiment of the present invention, the channel insertion and extraction circuitry routes the data between the wireless transceiver and at least portions of multiple television channels. As mentioned above, the gateway may inject or extract data from multiple television channels. Though not limited to one application, such may particularly well serve multi-room gaming.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
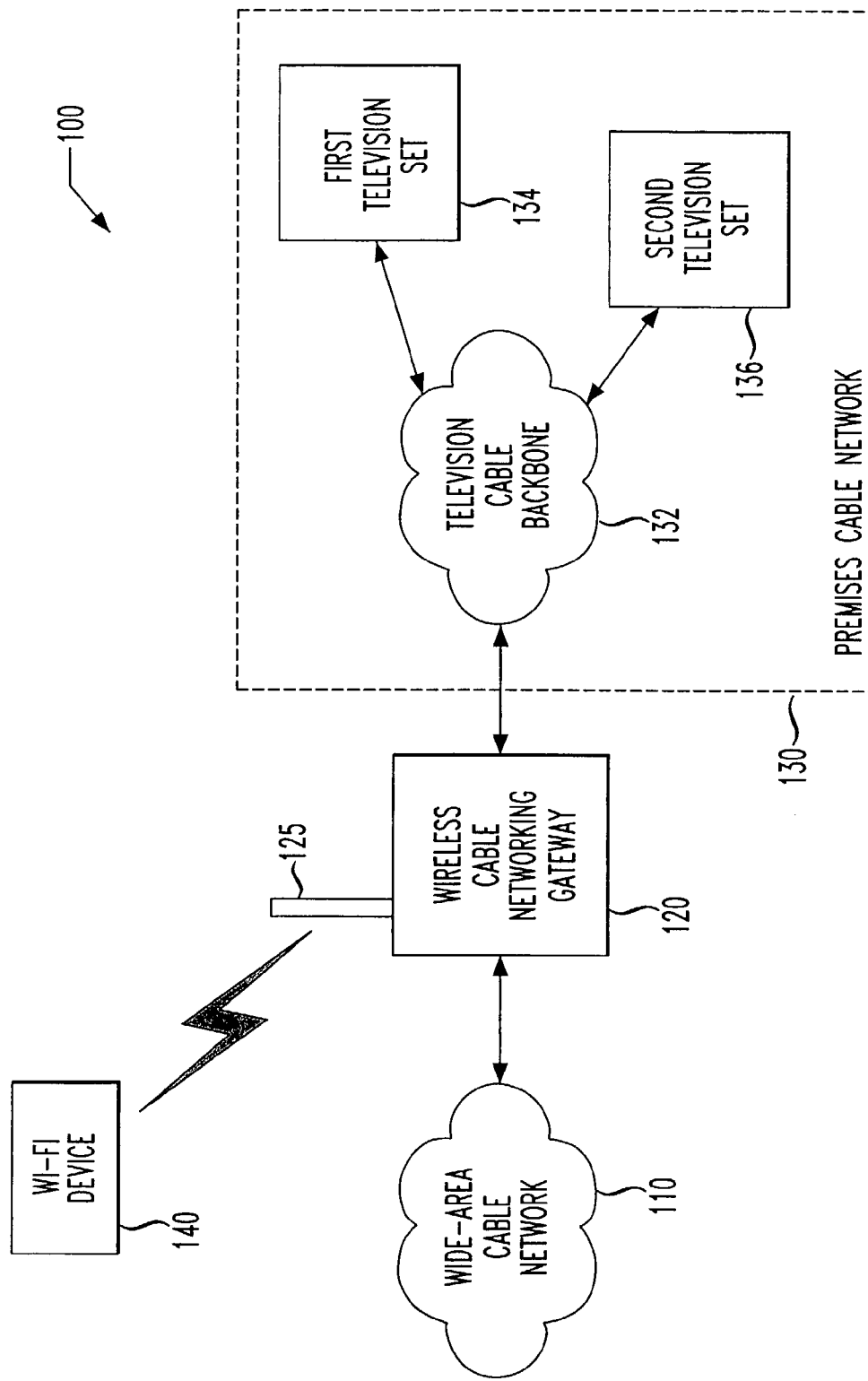
FIG. 1 illustrates a network diagram of an embodiment of a Wi-Fi system constructed in accordance with the principles of the present invention.

Referring initially to FIG. 1, illustrated is a network diagram of an embodiment of a Wi-Fi system, generally designated 100, constructed in accordance with the principles of the present invention. The Wi-Fi system 100 includes a wide-area cable network 110, a wireless cable networking gateway 120, a premises cable network 130 and a Wi-Fi device 140. The wireless cable networking gateway 120 includes an antenna 125. The premises cable network 130 includes a television cable backbone 132, a first television set 134 and a second television set 136.

The wide-area cable network 110 may be a conventional local cable television system that receives program signals from a satellite system and redistributes the program signals through wires to individual premises. Typically the wide-area cable network 110 includes a headend, a central receiving and processing station, that collects the various program signals and distributes the signals to coupled premises. The wide-area cable network 110 may distribute the program signals over a combination of fiber optic and coaxial wires. The wide-area cable network 110 may also include amplifiers to boost the signal from the headend to each coupled premise. In some embodiments, the wide-area cable network 110 may carry analog signals. In other embodiments, the wide-area cable network 110 may carry digital signals. In yet another embodiment, the wide-area cable network 110 may be a satellite system that delivers the program signals to each premise via a satellite receiver or dish.

The wireless cable networking gateway 120 is coupled to the wide-area cable network 110 and the premises cable network 130. The wireless cable networking gateway 120 includes the antenna 125 which may be a conventional antenna configured to receive data complying with IEEE Standard 802.11(b). In other embodiments, the antenna 125 and the wireless cable networking gateway 120 may receive or transmit data according to other wireless standards.

The wireless cable networking gateway 120 allows data communicated to or from the Wi-Fi device 140 to be injected into or extracted from a portion of at least one television channel. In a preferred embodiment, the wireless cable networking gateway 120 may route the data between the Wi-Fi device 140 to at least a portion of a television channel to be transmitted across the premises cable network 130 with remaining television channels being transmitted from the wide-area cable network 110 to the premises cable network 130. In another embodiment, the wireless cable networking gateway 120 may route the data to at least a portion of a television channel to be sent to other premises via the wide-area cable network 110. For example, a third television set and another wireless cable networking gateway, also coupled to the wide-area cable network 110, may be located at a different premise allowing the data from the Wi-Fi device 140 to be transmitted to the third television set. This may allow users at different premises to view or interact with Wi-Fi data from the Wi-Fi device 140.

To perform the above described functions, the wireless cable networking gateway 120 may include a Wi-Fi transceiver coupled to the antenna 125 for transferring the data to and from the Wi-Fi device 140. The wireless cable networking gateway 120 may also include digital/analog conversion circuitry coupled to the Wi-Fi transceiver for converting the data from and into the digital domain. Additionally, the wireless cable networking gateway 120 may include a wide-area cable interface that couples the wireless cable networking gateway 120 to the wide-area cable network 110 and channel insertion and extraction circuitry that couples the digital/analog conversion circuitry, the wide-area cable interface and the premises cable network. The wireless cable networking gateway 120 will be discussed in more detail with respect to FIG. 2.

The premises cable network 130 may be a conventional cable system or network within, for example, a home, a hotel or a hospital. The television cable backbone 132 may include an incoming node, for example a cable box, that typically receives program signals through a cable from the wide-area cable network 110. The television cable backbone 132 may also include cable and the connectors or additional hardware required to couple the cable box and deliver the program signals to the first television set 134 and the second television set 136. The first television set 134 and the second television set 136 may be conventional television sets capable of receiving a cable connection. Of course, additional television sets or other cabled-enabled viewing devices may be coupled to the television cable backbone 132, also. The cable used for the television cable backbone 132 may be standard coaxial cable traditionally used within cable networks. For example, the cable may be different grades of 75 Ohm coaxial cable including RG58, RG59, and RG6. One skilled in the art will understand the configuration and operation of a premises cable network.

The Wi-Fi device 140 may communicate the digital data to the first television set 134 or the second television set 136. The Wi-Fi 140 device may be any conventional device capable of transferring digital data to and from an IEEE 802.11(b) domain. In other embodiments, another wireless processing device may communicate to the first television set 134 or the second television set 136 employing another wireless standard. The Wi-Fi device 140 may communicate directly (peer to peer) with the wireless cable networking gateway 120 as in an ad hoc network or may communicate with the wireless cable networking gateway 120 through a WAP. In a preferred embodiment, the Wi-Fi device 140 may be wirelessly coupled to a Wi-Fi transceiver of the wireless cable networking gateway 120 through the antenna 125. The Wi-Fi device 140 may be, for example, a computer, a video cassette recorder, a video camera, a digital versatile disk player, a gaming system console, a gaming system controller or a digital camera.

Figure 2:
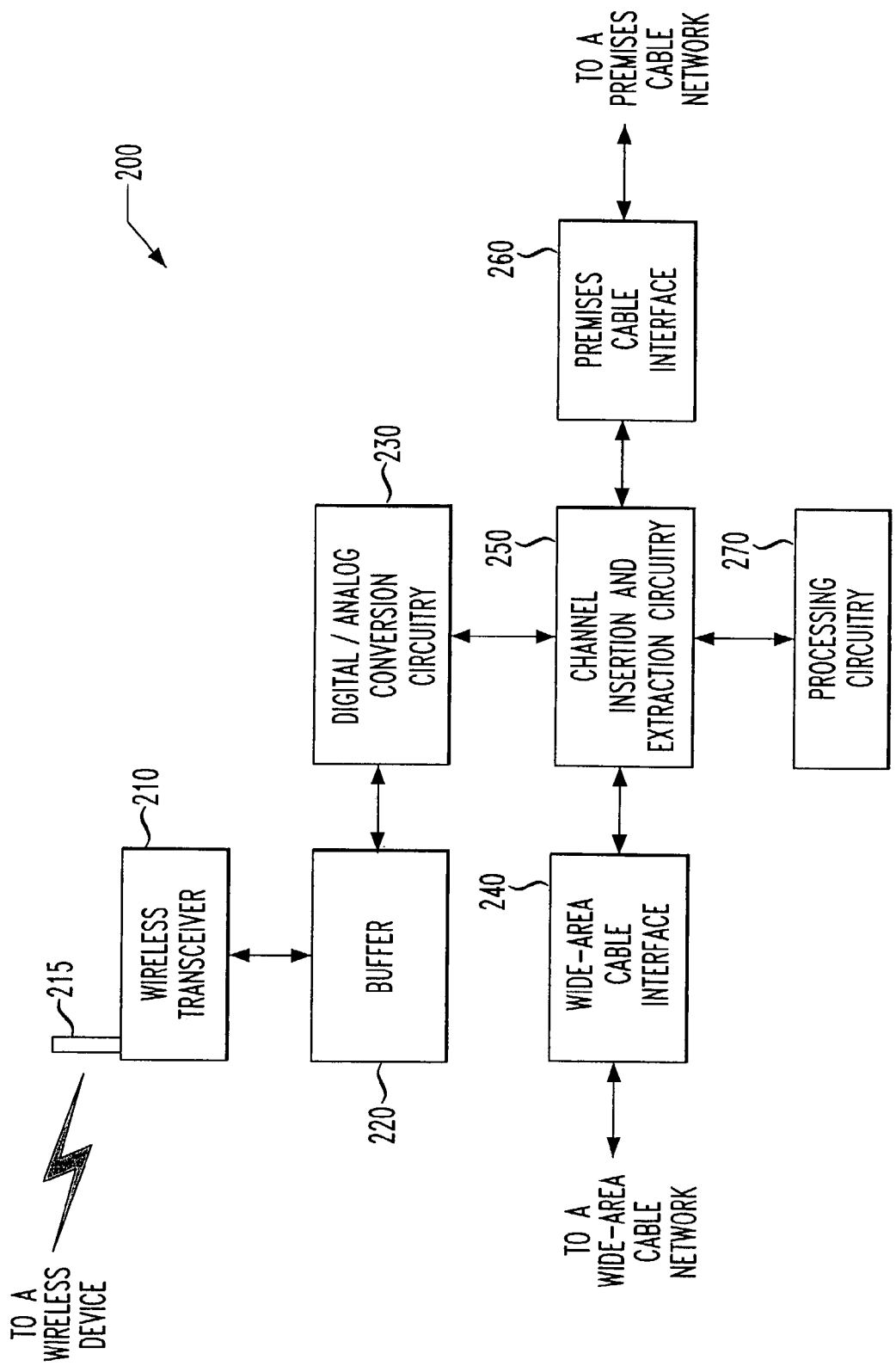
FIG. 2 illustrates a block diagram of an embodiment of a wireless cable networking gateway constructed in accordance with the principles of the present invention.

Turning now to FIG. 2, illustrated is a block diagram of an embodiment of a wireless cable networking gateway, generally designated 200, constructed in accordance with the principles of the present invention. The wireless cable networking gateway 200 includes a wireless transceiver 210, a buffer 220, digital/analog conversion circuitry 230, a wide-area cable interface 240, channel insertion and extraction circuitry 250, a premises cable interface 260 and processing circuitry 270. The wireless transceiver 210 includes an antenna 215.

The wireless transceiver 210 transfers data between wireless and wireline domains. The wireless transceiver 210 may wirelessly receive digital data from a wireless processing device via the antenna 215 and convert the digital data from a wireless protocol to a wireline protocol. The wireless transceiver 210 may also receive wireline digital data and convert the digital data from a wireline protocol to a wireless protocol for sending via the antenna 215. The wireless transceiver 210 may function as a conventional WAP. The antenna 215 may be a conventional antenna that receives wireless digital data according to IEEE standard 802.11. Of course, one skilled in the art will understand that the antenna 215 and the wireless transceiver 210 may receive and process wireless digital data according to other wireless standards.

The buffer 220 may be a conventional device for buffering the digital data. In a preferred embodiment, the buffer 220 interposes the wireless transceiver 210 and the channel insertion and extraction circuitry 250. In some embodiments, the buffer 220 may be coupled to the digital/analog conversion circuitry 230.

The digital/analog conversion circuitry 230 may be a conventional converter for converting the data between digital and analog domains. In a preferred embodiment, the digital/analog conversion circuitry 230 interposes the wireless transceiver and the channel insertion and extraction circuitry 250. In some embodiments, the wide-area cable interface 240 and the premises cable interface 260 may be coupled to digital networks and the digital/analog conversion circuitry 230 may not be required.

The wide-area cable interface 240 and the premises cable interface 260 may be conventional cable interfaces for coupling the wireless cable networking gateway 200 to a wide-area cable network and a premises cable network, respectively. The wide-area cable network and the premises cable network may be digital networks wherein the wide-area cable interface 240 and the premises cable interface 260 would be digital interfaces. In other embodiments, the wide-area cable network and the premises cable network may be analog networks wherein the wide-area cable interface 240 and the premises cable interface 260 would be analog interfaces.

The wide-area cable interface 240 and the premises cable interface 260 may be passive interfaces configured to receive a common F Connector. In other embodiments, the wide-area cable interface 240 and the premises cable interface 260 may receive a BNC, TNC, or RCA connectors. In another embodiment, the wide-area cable interface 240 and the premises cable interface 260 may be controlled by the processing circuitry 270.

The channel insertion and extraction circuitry 250 couples the wireless transceiver 210, the wide-area cable interface 240 and the premises cable interface 260. The channel insertion and extraction circuitry 250 may be a dedicated device constructed of special-purpose hardware directed by a sequence of operating instructions. In one embodiment the channel insertion and extraction circuitry 250 may be within a digital signal processor (DSP).

The channel insertion and extraction circuitry 250 may route the data between the wireless transceiver 210 and a television channel transmitted across the premises cable interface 260. In one embodiment, the channel insertion and extraction circuitry 250 may route the data between the wireless transceiver 210 and a portion of a television channel to be transmitted across the premises cable interface 260. The remaining television channels or portion of a television channel transmitted across the premises cable interface 260 may be transmitted from the wide-area cable interface 240. Of course, the channel insertion and extraction circuitry 250 may also route the data between the wireless transceiver 210 and a television channel transmitted across the wide-area cable interface 240. In this embodiment, the data may be viewed on a television channel or a portion of a television channel at a television set located at another premise.

In a preferred embodiment, the television channel for routing the data may be selected remotely from a variety of available television channels. In some embodiments, the television channel may be preprogrammed and not selectable after manufacturing. In other embodiments, the television channel may be selectable between a limited number of channels.

The wireless transceiver 210 may also receive data from multiple Wi-Fi devices and the channel insertion and extraction circuitry 250 may insert the data from each Wi-Fi device onto separately selected television channels. The separate television channels may permit multi-room game competition between several users while viewing separate television channels on separate television sets. In addition, the channel insertion and extraction circuitry 250 may combine the data from each of the Wi-Fi devices onto one selected television channel allowing simultaneous viewing of the data from several Wi-Fi devices on one television set. Likewise, the channel insertion and extraction circuitry 250 may also extract data from more than one television channel.

The channel insertion and extraction circuitry 250 routes data from and to the wireless devices by inserting and extracting the data from the selected television channels. The channel insertion and extraction circuitry 250 may insert the data on a television channel by employing a filter or filters to remove the program signals within a frequency bandwidth associated with the television channel and add the data from the wireless transceiver 210 to the associated frequency bandwidth. In some embodiments, the channel insertion and extraction circuitry 250 may filter a portion of the television channel bandwidth and replace removed program signals with the data from the wireless transceiver 210. Similarly, the filters may capture data from at least a portion of a television channel transmitted across the wide-area cable interface 240 or the premises cable interface 260 for the captured data to be sent to the wireless transceiver 210.

The channel insertion and extraction circuitry 250 may also include modulate/demodulate circuitry for routing the data between the wireless transceiver 210 and television channels. The modulate/demodulate circuitry may be coupled to filters and the digital/analog conversion circuitry 230 to modulate or demodulate the data for either insertion or extraction of data to or from a television channel. For insertion, the modulate/demodulate circuitry may modulate the analog data from the digital/analog conversion circuitry 230 to the proper frequency of the selected television channel. For extraction, the modulate/demodulate circuitry may demodulate the captured data from the selected television channel before the data is sent to the digital/analog conversion circuitry 230 and the wireless transceiver 210.

The processing circuitry 270 may be a conventional microprocessor that directs and controls the operation of the wireless cable networking gateway 200. In some embodiments, the processing circuitry 270 may be an Application Specific Integrated Circuit (ASIC). The processing circuitry 270 may be coupled to and provide coordination between each component of the wireless cable networking gateway 200. The processing circuitry 270, therefore, may also direct the operation of the buffer 220 and the conversion of data between the digital and analog domains by the digital/analog conversion circuitry 230.

In addition, the processing circuitry 270 may be coupled to the channel insertion and extraction circuitry 250. The processing circuitry 270 may allow a user to remotely select which television channel to route the data. For remote selection, the processing circuitry 270 may be coupled with a conventional remote controller that permits the selection of a television channel for data routing. The processing circuitry 270 and the remote controller may also permit the selection of a portion of a television channel for data routing. The processing circuitry 270 and the remote controller may perform television channel selection as a conventional television set with a remote controller presently allows remote television channel selection for viewing. One skilled in the art will understand the operation and configuration of the processing circuitry 270 and the interaction of the processing circuitry 270 with the other components of the wireless cable networking gateway 200.

Figure 3:
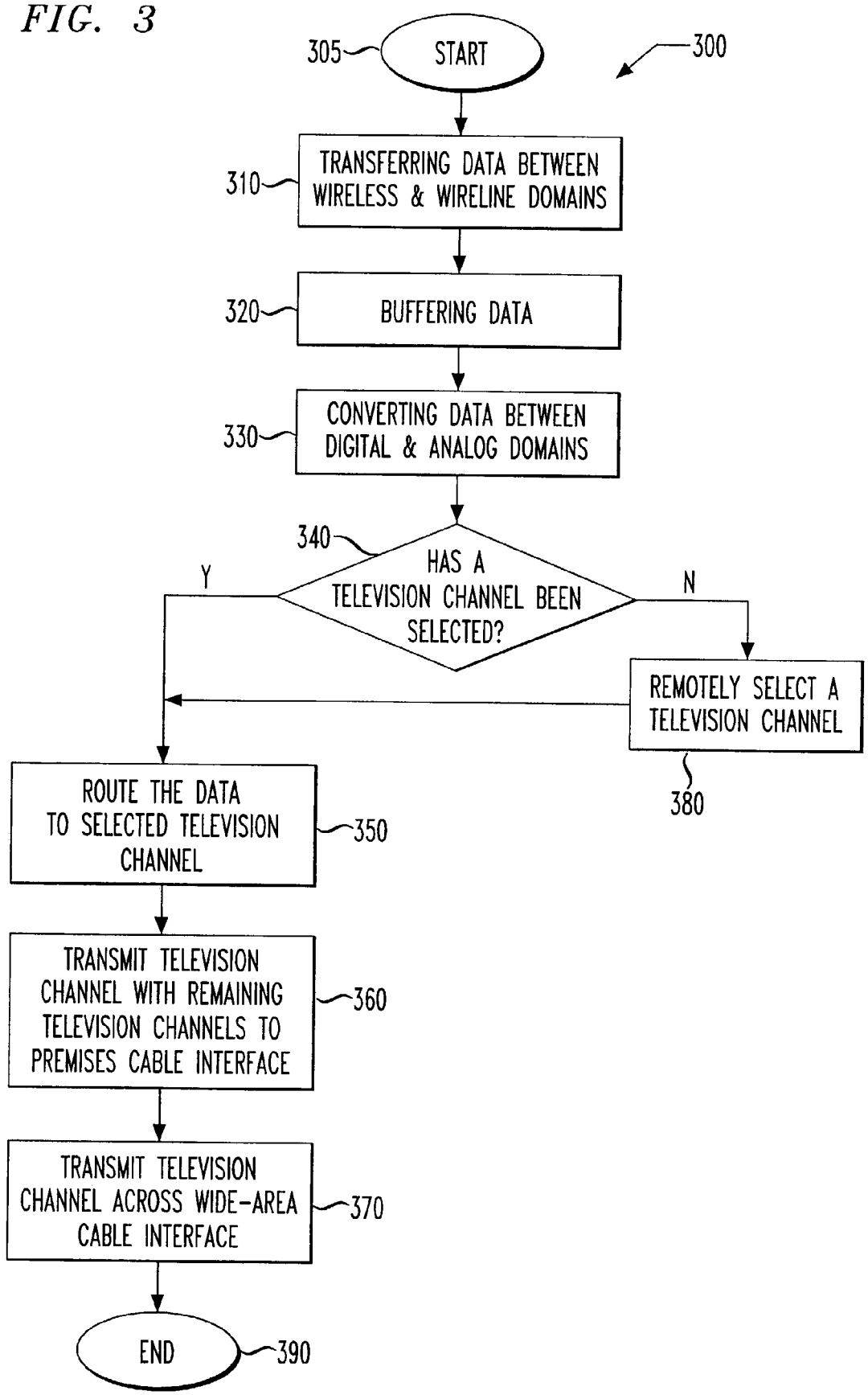
FIG. 3 illustrates a flow diagram of an embodiment of a method of wireless cable networking constructed according to the principles of the present invention.

Turning now to FIG. 3, illustrated is a flow diagram of an embodiment of a method of wireless cable networking, generally designated 300, constructed according to the principles of the present invention. The method 300 starts in a step 305 with an intent for wireless cable networking.

Data is transferred between a wireless domain and a wireline domain in a step 310. The data may be transferred from a wireless processing device, such as a Wi-Fi device, to a wireless cable networking gateway. The wireless cable networking gateway may include a wireless transceiver which receives the data from the wireless device.

After the data is transferred, the data is buffered in a step 320. The data may be buffered employing a conventional digital buffer. The buffer may be controlled by processing circuitry such as a conventional microprocessor. In one embodiment, the wireless transceiver may be coupled to the digital buffer.

After the data is buffered, the data is converted from a digital domain to an analog domain. The data may be converted by a conventional digital to analog converter. The digital to analog converter may be coupled to and controlled by the microprocessor. In one embodiment, the digital to analog converter may be coupled to the buffer.

After converting the data, a determination is made if a television channel to be transmitted across a premise cable interface has been selected in a decisional step 340. The processing circuitry may determine if a television channel has been selected. In some embodiments, the processing circuitry may cooperate with channel insertion and extraction circuitry to determine if a television channel has been selected.

If a television channel has been selected, the data is routed to the television channel in a step 350. The data may be routed to the television channel by the channel insertion and extraction circuitry. The channel insertion and extraction circuitry may route the data on an entire television channel or on a portion of a television channel. The channel insertion and extraction circuitry may be coupled to the digital to analog converter, the premises cable interface and a wide-area cable interface. The wide-area cable interface may receive television channels for a premises cable network from a wide-area cable network.

After routing the data, the television channel and remaining television channels are transmitted to a premises cable interface in a step 360. The remaining television channels may be the television channels from the wide-area cable network excluding the selected television channel. Of course, in some embodiments, more than one television channel may be selected for routing data.

Additionally, the television channel is transmitted across the wide-area cable interface in a step 370. The television channel having the data may then be viewed at other premises coupled to the wide-area cable network. The channel insertion and extraction circuitry may transmit the television channel across the wide-area cable interface. Finally, wireless cable networking ends in a step 390.

Returning now to the decisional step 340, if a television channel has not been selected, then a television channel is remotely selected in a step 380. The television channel may be remotely selected by employing a remote controller coupled to the processing circuitry. Of course, in some embodiments the television channel may also be selected at the wireless cable networking gateway instead of remotely. After remotely selecting a television channel, the method 300 proceeds to step 350.

FIG. 3 and the corresponding discussion represent the transfer of data from a wireless device to a television channel. One skilled in the art will understand that data may also be extracted from the television channel and transferred from the wireline domain to the wireless domain. When extracting data, the data may be converted from the analog domain to the digital domain and then converted from a wireline domain to a wireless domain.

Figure 4:
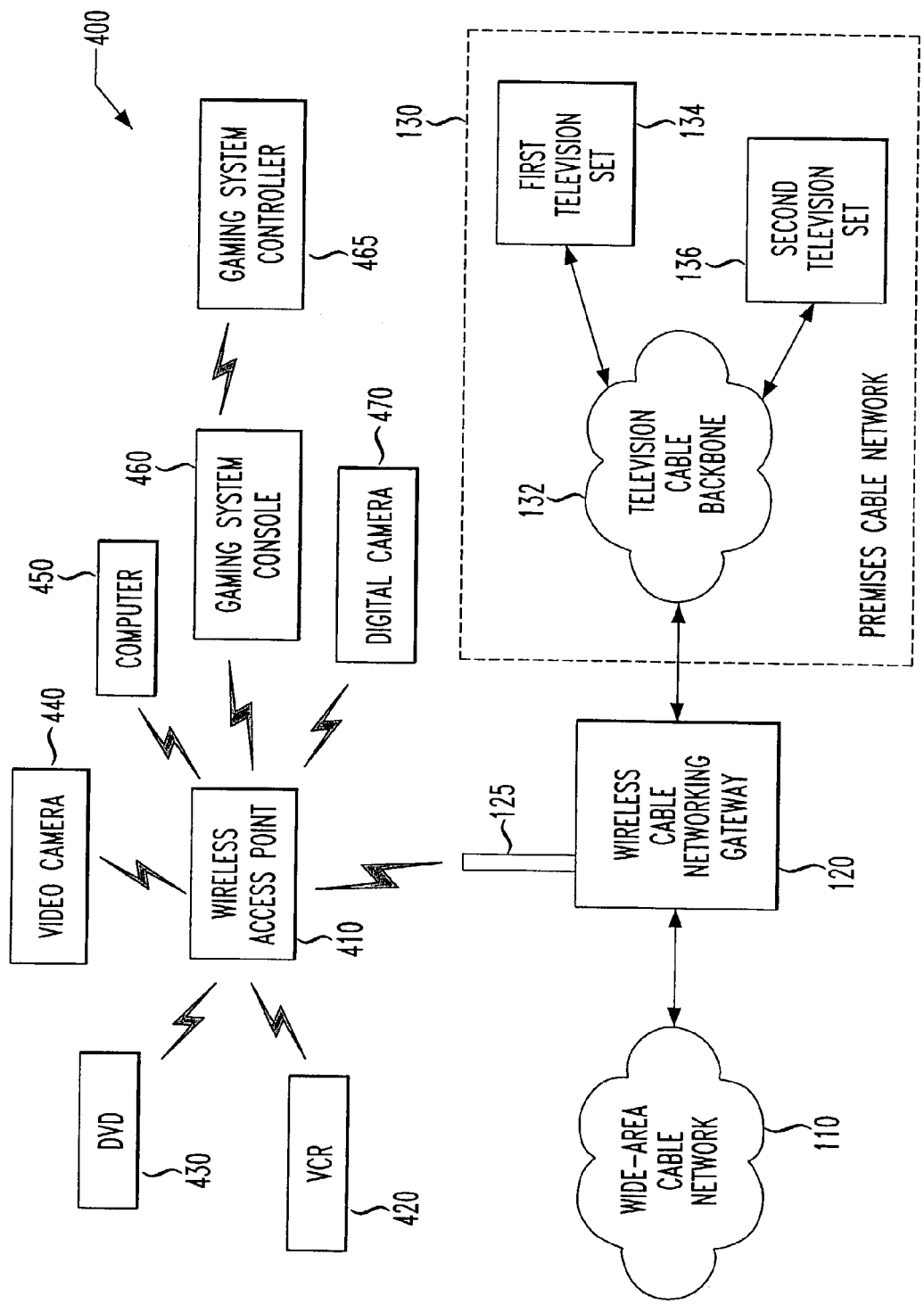
FIG. 4 illustrates a network diagram of another embodiment of a Wi-Fi system constructed in accordance with the principles of the present invention.

Turning now to FIG. 4, illustrated is a network diagram of an embodiment of a Wi-Fi system, generally designated 400, constructed in accordance with the principles of the present invention. The Wi-Fi system 400 includes the Wi-Fi system 100 and additional Wi-Fi devices coupled to the wireless cable networking gateway 120 via a WAP 410. The Wi-Fi devices include a video cassette recorder (VCR) 420, a digital versatile disk player (DVD) 430, a video camera 440, a computer 450, a gaming system console 460 wirelessly coupled to a gaming system controller 465 and a digital camera 470. The WAP 410 and each device may be standard devices capable of operating within the IEEE 802.11(b) domain. The Wi-Fi system 400, however, may also be configured to operate at other wireless standards. Of course, other devices having a Wi-Fi output may also be coupled to the WAP 410.

The Wi-Fi system 400 may simplify interconnections of home entertainment systems by employing Wi-Fi coupling and the existing television cable backbone 132. The Wi-Fi system 400 may allow simultaneous viewing of a movie from, for example, the VCR 420, the DVD 430, the video camera 440 or the computer 450 on the first television set 134 or the second television set 136. Additionally, the Wi-Fi system 400 may be located at a school or hospital and provide a live closed-circuit telecast throughout the premises cable network 130 from the video camera 440 or a web cam connected to the computer 450 while recording the telecast using the VCR 420 or the computer 450.

Additionally, the Wi-Fi system 400 may provide a wireless portal to allow viewing digital pictures from the digital camera 470 at the computer 450, first television set 134, the second television set 136 or another television set located at another premise. The Wi-Fi system 400 may also provide a connection from the digital camera 470 to the computer 450 to download and save the digital pictures. Of course, one skilled in the art will understand that the Wi-Fi system 400 may provide additional viewing advantages than those discussed and that other Wi-Fi capable devices may be coupled thereto.

Figure 5:
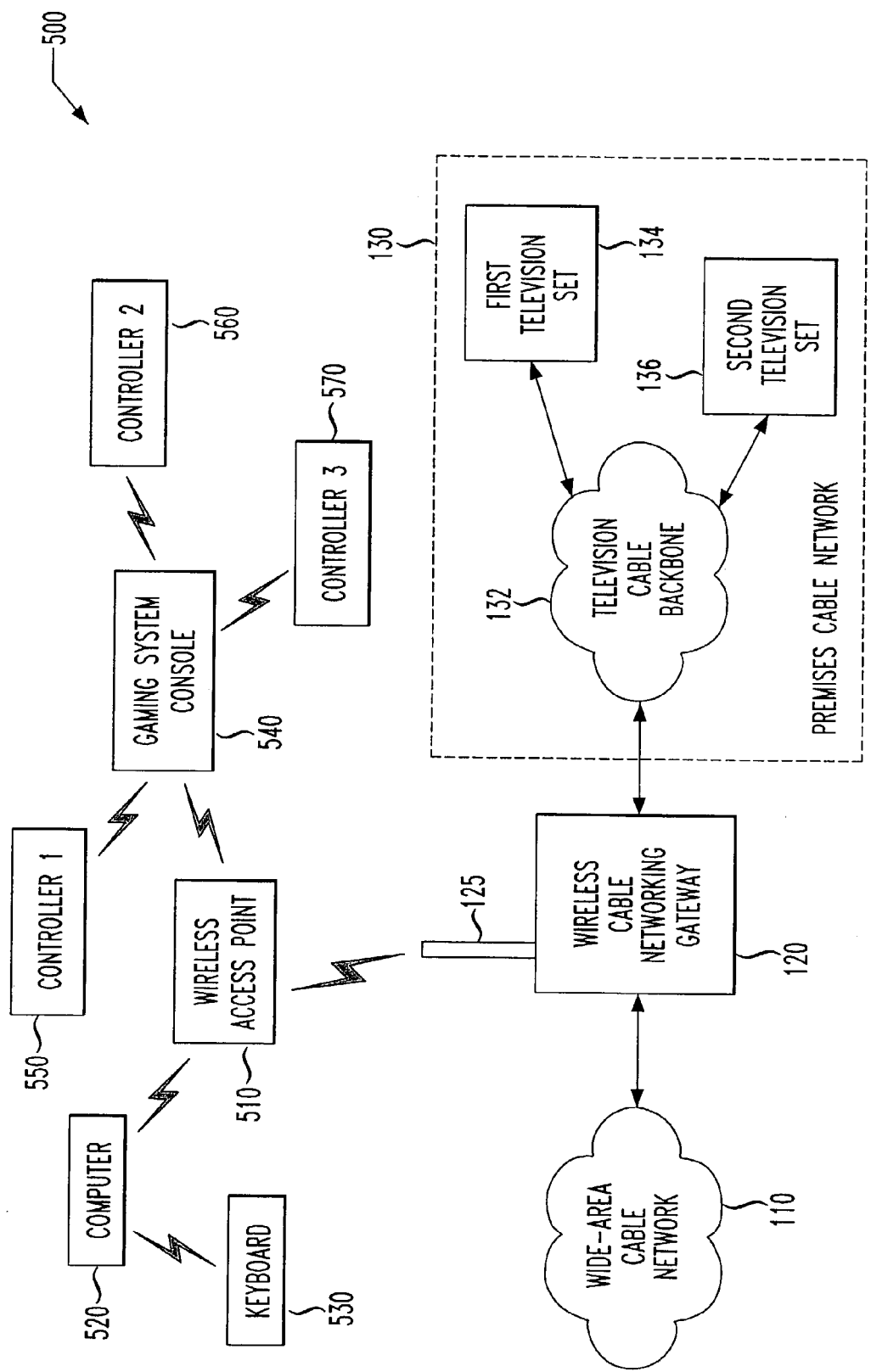
FIG. 5 illustrates a network diagram of yet another embodiment of a Wi-Fi system constructed in accordance with the principles of the present invention.

Turning now to FIG. 5, illustrated is a network diagram of an embodiment of a Wi-Fi system, generally designated 500, constructed in accordance with the principles of the present invention. The Wi-Fi system 500 includes the Wi-Fi system 100 and additional Wi-Fi devices coupled to the wireless cable networking gateway 120 via a WAP 510. The Wi-Fi devices include a computer 520 wirelessly coupled to a keyboard 530 and a gaming system console 540 wirelessly coupled to a first, second and third gaming system controller 550, 560, 570.

The Wi-Fi system 500 may allow Internet searching on the computer 520 via the keyboard 530 with the results viewed on either the first television set 134, the second television set 136 or any other television set or viewing device that is connected to the premises cable network 130. The Wi-Fi system 500 may also allow simultaneous viewing of the results and a program on a selected television channel. In addition, the Wi-Fi system 500 may allow multi-room gaming between several players using the first, second and third gaming system controller 550, 560, 570 and remotely located at the first television set 134, the second television set 136 or other viewing devices which may be connected to the Wi-Fi system 500.

Although the present invention has been described in detail, those skilled in the art should understand that they can make various changes, substitutions and alterations herein without departing from the spirit and scope of the invention in its broadest form.

What is claimed is:

1. A Wi-Fi system, comprising:
 (A) a premises cable network, including:
  (1) a television cable backbone, and
  (2) at least one television set coupled to said television cable backbone;
 (B) a wireless cable networking gateway coupled to said premises cable network and a wide-area cable network and including:
  (1) a Wi-Fi transceiver for transferring wireless data to and from an IEEE 802.11 domain,
  (2) digital/analog conversion circuitry, coupled to said Wi-Fi transceiver, for converting said wireless between digital and analog domains,
  (3) a wide-area cable interface for coupling said wireless cable networking gateway to said wide-area cable network, and
  (4) channel insertion and extraction circuitry, coupling said digital/analog conversion circuitry, said wide-area cable interface and said premises cable network, that routes said wireless data between said wireless transceiver and at least a portion of a television channel to be transmitted across at least said premises cable network by inserting said wireless data to and extracting said wireless data from said at least a portion of a television channel, remaining television channels being transmitted from said wide-area cable interface to said premises cable network; and
 (C) at least one Wi-Fi device, wirelessly coupled to said Wi-Fi transceiver, for communicating said wireless data therewith and to said at least one television set.

2. The Wi-Fi system as recited in claim 1 wherein said Wi-Fi device is selected from the group consisting of:
 a computer,
 a video cassette recorder,
 a video camera,
 a digital versatile disk player,
 a gaming system console,
 a gaming system controller, and
 a digital camera.

3. The Wi-Fi system as recited in claim 1 further comprising processing circuitry, coupled to said channel insertion and extraction circuitry, that allows said television channel to be remotely selectable.

4. The Wi-Fi system as recited in claim 1 further comprising a buffer, interposing said wireless transceiver and said channel insertion and extraction circuitry, for buffering said wireless data.

5. The Wi-Fi system as recited in claim 1 wherein said at least said portion of said television channel is further transmitted across said wide-area cable interface.

6. The Wi-Fi system as recited in claim 1 wherein said channel insertion and extraction circuitry routes said wireless data between said wireless transceiver and at least portions of multiple television channels.

* * * * *